June 2, 1970 E. W. PUGH 3,516,079

MAGNETIC STORAGE DEVICE WHICH EXHIBITS PSEUDO-BIAXIAL MAGNETIC PROPERTIES

Filed June 29, 1966 2 Sheets-Sheet 1

INVENTOR
EMERSON W. PUGH

BY

Bertram W. Mullin
ATTORNEY 3,516,079
Patented June 2, 1970

1

3,516,079

MAGNETIC STORAGE DEVICE WHICH EXHIBITS PSEUDO-BIAXIAL MAGNETIC PROPERTIES

Emerson W. Pugh, Hughsonville, N.Y., assignor to International Business Machines Corporation, Armonk, N.Y., a corporation of New York Filed June 29, 1966, Ser. No. 561,572
Int. Cl. G11c 7/00, 11/14
U.S. Cl. 340—174 1 Claim

ABSTRACT OF THE DISCLOSURE

A storage device having a magnetic element exhibiting an easy axis of magnetization and a hard axis in quadrature thereto is operative in a non-coincident current selection mode by utilizing magnetic elements having a selected amount of dispersion therein.

The invention relates to magnetic thin film devices and in particular to noncoincident current selection magnetic thin film devices of the type finding application in computer and data processing machines.

Magnetic thin films are finding wide application as computer storage and logic elements. This stems from the discovery that when a permalloy film is deposited on a substrate with a static magnetic field applied in the given direction during deposition, an easy axis develops in that given direction. That easy axis, or anisotropy, remains even after the static field is removed upon completion of the deposition process. The significance of this anisotropy is better appreciated from the mathematical representation of anisotropy, i.e., $K_u \sin^2\theta$ where $K_u$ is the first order uniaxial constant and $\theta$ is the angle between the magnetization and the easy axis. What this indicates is that there are two antiparallel directions of minimum energy, thus providing two stable states for the storage of the information.

Many of the advantages of magnetic thin film devices are realized in the storage array in which a network of drive lines is inductively coupled in such a manner as to form a matrix of bit sites, a bit being a single bistable storage element. That network includes two sets of drive lines with each of the members of each set being parallel to the other members of the same set. One of the sets is disposed parallel to the easy axis of magnetic film and the second set is placed in quadrature to the first set. Both sets are inductively coupled to the film. The network takes the form of a lattice or a matrix containing longitudinal and lateral coordinates with the bits being located wherever a member from the first set of drive lines intersects a member from the second set. Rotation of the magnetization is induced by activating selected members from the drive lines of both sets. Interrogation of information is performed by activating one (or more) drive line(s) of one set to induce a field which rotates the magnetization from the easy axis. This rotation is detected as a voltage output by suitable sensing devices.

Orthogonal mode switching devices generally assume one of three modes as a basis for operation:

In the standard uniaxial mode, an easy axis lies in the plane of the film and the film has a very low dispersion. The magnetization lies along that easy axis and is held in the hard direction only as long as the word current is applied. Reading is accomplished by application of a word current over the bits to be read out while writing a 1 or a 0 requires a positive or a negative bit current in coincidence with a word current.

In the second mode, the DL mode, also known as dispersion locked mode, which is the subject of U.S. Patent

2

Application Ser. No. 334,858 to Bertelsen et al., now Pat. No. 3,435,428 which patent application is assigned to the assignee of the instant application, a uniaxial film with a relatively high dispersion is used such that a stable state exists in the hard direction. Reading is accomplished with a word pulse and information is read into the film by applying a word pulse to write a 0 or by the coincidence of a positive bit pulse with a word pulse to write a 1. Thus only one unipolar bit drive is required.

In a third mode, the non-coincident current mode, which is the subject of U.S. Pat. 3,071,756, which is assigned to the assignee of the instant application, a coincidence of word and bit currents is not required at write time. As described in that patent, the film is biaxial, that is, it contains two orthogonal easy axes. This is achieved only by growing a single crystal film epitaxially by combined stresses and annealing treatments to create crystalline orientation or by other relatively complex fabrication techniques. In storage operation, only one of the two easy axes is used for storage while the second easy axis is used as an intermediate state. After reading out information by a word pulse, the magnetization is left in the intermediate state. Writing is accomplished by a subsequent bit pulse having either a positive or a negative polarity to toggle the film from the intermediate state either to a 1 or to a 0 state. The fact that this mode does not require the coincidence of word and bit currents greatly reduces time and problems to the circuits and permits the development of a faster and cheaper memory. The major disadvantage is the difficulty of economically and reproducibly fabricating biaxial devices.

Now, what has been discovered is that a uniaxial film may be caused to exhibit pseudo-biaxial properties if it is fabricated with the correct amounts of dispersion. This discovery permits non-coincident current mode without the expensive and very difficult problems of fabricating biaxial devices. The correct amount of dispersion has been found to be 6° to 10° as measured by the Crowther technique in permalloy films 700 angstroms to 1000 angstroms thick. (See T. S. Crowther, "Techniques for Measuring the Angular Dispersion of the Easy Axis of Magnetic Films" Group Report No. 51–2, MIT Lincoln Lab, Lexington, Mass. 1959.) This contrasts with a desired dispersion of 0° to 4° for the standard uniaxial mode and approximately 16° for the DL mode.

Dispersion refers to microscopic deviations from the macroscopic easy axis of the film. The magnetization cannot follow the details of the microscopic easy axis due to magnetostatic and exchange forces which, in general, tend to cause all magnetization to be parallel in the film. A minimization of these various energy contributions results in a magnetization ripple along the macroscopic easy axis. The magnitude of the dispersion might be given in terms of the ripple angle or microscopic anisotropy variations—but these are difficult to measure. The angle at which a large magnetic field must be applied from the hard axis in order to cause 90 percent or more of the magnetization to rotate to the same direction, parallel to the easy axis upon removal of the field is frequently given as the dispersion angle. Numerous variations in this technique exist and the exact numerical value quoted for films will depend somewhat on the technique employed.

It is then a primary object of this invention to provide an improved magnetic storage element wherein selection is accomplished by non-coincident current techniques.

Another object of this invention is to provide an improved non-coincident current selection magnetic storage array employing elements exhibiting uniaxial anisotropy with a selected dispersion throughout.

Another object of this invention is to provide a non-coincident current writing means for magnetic thin films having uniaxial anisotropy characterized by the select dispersion throughout having a higher intrinsic speed than heretofore available.

It is still a further object of this invention to provide a magnetic thin film having uniaxial anisotropy with a select dispersion throughout that lends itself to both economical and commercial fabrication.

The foregoing and other objects and advantages of the invention will be apparent from the following more particular description of preferred embodiments of this invention as illustrated in the accompanying drawings.

The previous discussion is briefly amplified in order to place the particulars to follow in proper perspective. In FIGS. 1, 2, 3 and 4, the magnetization direction is represented by the location of the black ball. With biaxial anisotropy there are four stable states (0°, 90°, 180° and 270°). During the application of a word pulse the ball is removed from a 0 to 1 state to the *"i"* state at 90°. Here it remains in the energy valley indefinitely until a bit pulse $H_0$ or $H_1$ is applied to switch it 90° into either the 0° (zero state) or 180° (one state). The fact that a much larger field is required to switch the magnetization by 180° than 90° is necessary for the function of the device under disturb conditions. This property of biaxial films is not apparent from the energy curve but is readily obtained from the mathematic representation of biaxial anisotropy.

Figure 1:
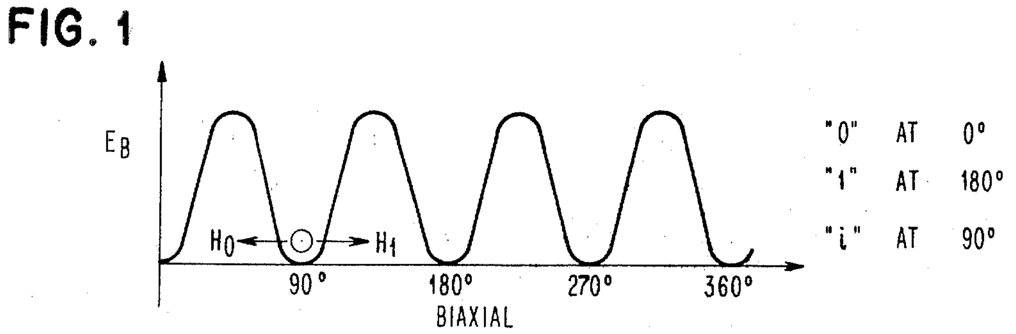
FIG. 1 represents respectively the magnetization energy states for a biaxial film.
Figure 2:
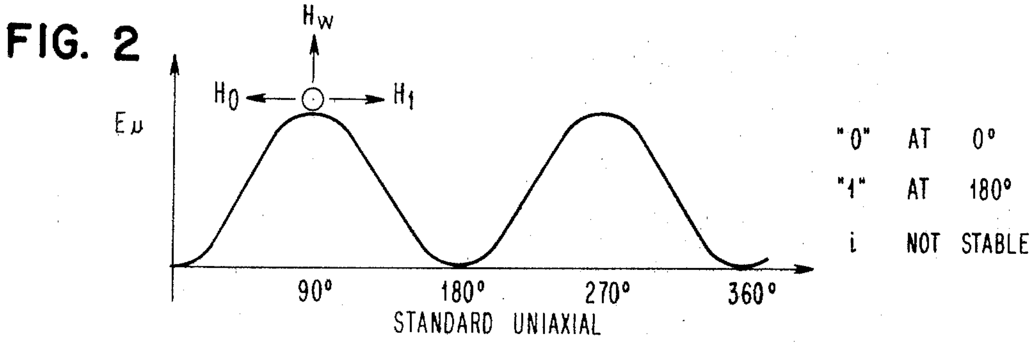
FIG. 2 represents respectively the magnetization energy states for uniaxial (no dispersion) film.
Figure 3:
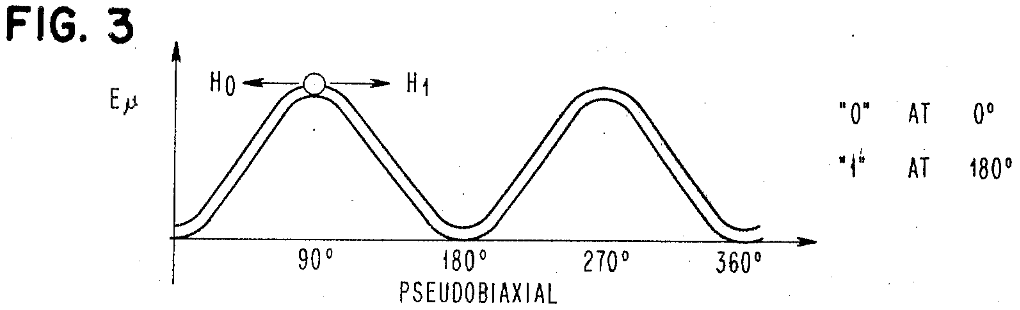
FIG. 3 represents respectively magnetization energy states for uniaxial medium dispersion film.
Figure 4:
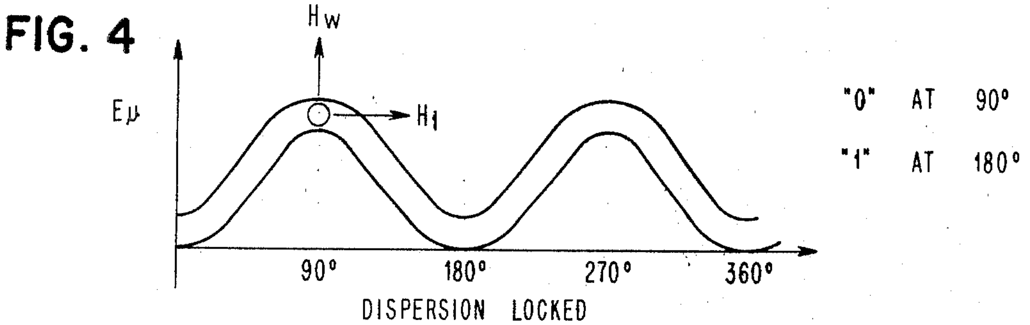
FIG. 4 represents respectively the magnetization states for a uniaxial high dispersion film.

The standard uniaxial energy curve of FIG. 2 shows only two stable directions, 0° and 180°. During the application of the word pulse $H_w$ the magnetization is at 90° from the easy axis but falls back to the 0° or 180° state when the pulse is turned off. A small positive or negative bit pulse $H_1$ or $H_0$ applied simultaneously with the word pulse determines which way the magnetization rotates and thus determines the stored information.

The pseudo-biaxial energy curve may be thought of as a simple uniaxial curve with a mushy substance on top (dispersion) into which the ball sinks. After application of the word pulse the ball sits on top of the energy peak, prevented from rolling to the right or left by the (dispersion) mushy coating. A bit pulse either $H_0$ or $H_1$ applied at an arbitrary time later causes the ball to rotate either to the 180° or 0° state. For this to work it is essential that there be enough dispersion to hold the ball at the top of the energy curve but not so much that it cannot be moved by reasonably small pulse $H_0$ or $H_1$.

The dispersion locked mode requires enough dispersion so that the ball will remain on the top of the energy peak even in the presence of bit pulses $H_1$. The 90° position is then used as the 0 storage state. To switch to a 1 state, a word pulse $H_w$ must be applied to lift the ball out of the mush (dispersion) and simultaneously applied pulse $H_1$ moves it to the 1 state.

The pseudo-biaxial film properties described by this invention require control of the dispersion in the device. Methods for controlling dispersion are described in the literature. For example, see The Review article by E. W. Pugh and T. O. Mohr, "Properties of Ferromagnetic Films" chapter 7, pages 195 to 286 in "Thin Films" (Ed.: H. G. Wilsdorf) American Society for Metals, 1964.

Figure 5:
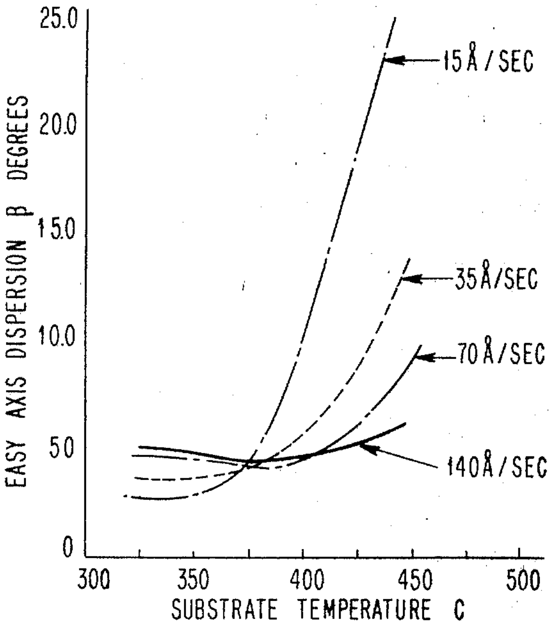
FIG. 5 shows a typical plot of dispersion versus substrate temperature and deposition rates for permalloy films.

Dispersion is controlled by varying substrate temperature during deposition, by post-deposition anneal, by composition control, rate of deposition, and substrate roughness, and is effected by a variety of other process parameters. FIG. 5 shows a typical plot of dispersion versus substrate temperature and deposition rate of permalloy films. It should be noted, however, that all process parameters enter into the details of such a curve so that the exact temperature required for a given dispersion must be empirically determined for each processing equipment and condition.

The processing technique that has been used to produce films of desired properties is as follows:

A silver or copper substrate is heated in a vacuum for one hour to a temperature of 350° C. and a layer of chromium is deposited to a thickness of 700 angstroms to provide for good adhesion of the subsequent layers. Next silicon monoxide is deposited at a temperature of 300° C. to a thickness of about 1.5 microns for surface smoothness. Thereafter a nickel-iron coating is deposited at 40 angstroms per second from 100 grams of 82.5 nickel and 17.5 iron from an aluminum crucible which is induction heated and positioned 18 inches below the substrate which has a temperature of 360° C. A DC magnetic field of over 30 oersteds is applied parallel to the substrate during deposition of the nickel-iron film and not turned off until the substrate is cooled to about 100° C. The nickel-iron film is then etched to form desirable bit sites. Since the dispersion is critically dependent on the exact processing parameters, the foregoing requires careful control for each evaporator used.

Figure 7:
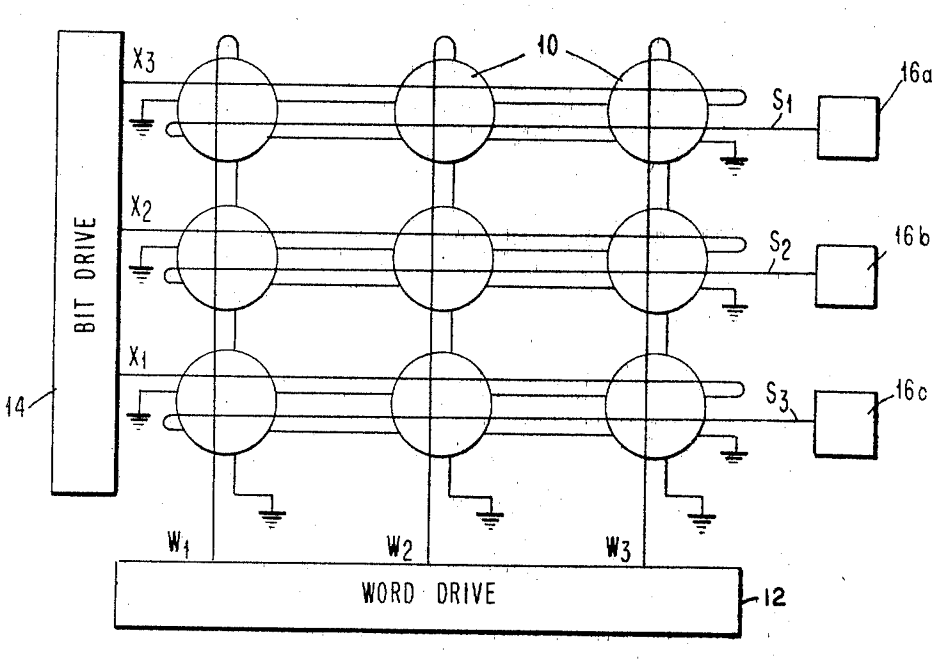
FIG. 7 illustrates a non-coincident current selection magnetic storage array in accordance with the present invention.

Referring now to FIG. 7, there is shown in schematic illustration a two dimensional word-organized storage array. The storage array of FIG. 7 is provided with a plurality of magnetic elements 10 arranged in word columns and bit rows. Each column of elements is coupled by one of three word drive windings $W_1$–$W_3$ which in turn is connected to a word address and drive means 12. Each of the different rows is further coupled by respective bit line drive windings $X_1$–$X_3$, which windings are in turn connected to a bit address drive means 14. Each of the elements 10 is further coupled by a respective sense winding $S_1$–$S_3$ having one end connected to a ground and the other end connected to respective sense amplifiers 16A, 16B, and 16C.

Figure 6:
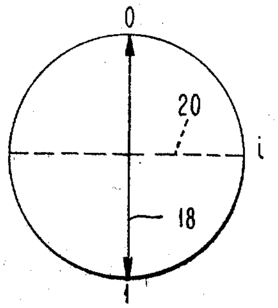
FIG. 6 illustrates the storage directions and intermediate states of the bit cell in accordance with the present invention.
Figure 8:
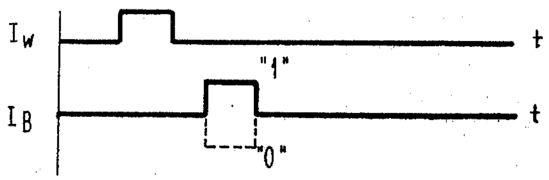
FIG. 8 illustrates a pulse program for the operation of the storage array of FIG. 7.

Referring to FIGS. 6 and 8 the rest state for magnetization of each bit in the memory of FIG. 7 resulting from the pulse program of the different coordinate address lines W and X, can be determined for the operation of the memory. Assume that information is stored in the storage array and each of the elements 10 is positioned in the storage arrays so that the axis 18 is in a line with the word address lines $W_1$–$W_3$ while the intermediate axis 20 is in alignment with the bit address drive lines X.

With information to be stored in the particular address location, the information previously placed therein is first read out. Assume a binary 1 is stored in a bit site such as shown in FIG. 7, accordingly, upon activation of a selected one of the drive lines $W_1$–$W_3$ with a pulse $I_w$ shown in FIG. 8, all bit elements 10 along the selected word lines have their magnetization rotated into the intermediate axis *"i."* Upon cessation of the word pulse the magnetic dipoles remain locked due to dispersion and exchange coupling in the direction of the intermediate axis. To write information into the bit cell all of the drive lines $X_1$–$X_3$ are energized as shown in FIG. 8 with either a positive or a negative polarity pulse. Energization of the drive lines X by a positive polarity pulse switches the magnetic dipoles from orientation parallel to the intermediate axis "i" to an orientation depicted by the binary 0 of FIG. 6. Similarly, energization of drive line X by a negative polarity impulse switches the magnetic dipoles from orientation along the intermediate axis to an orientation depicted by binary 1 of FIG. 6. The field required to switch the magnetization from the easy axis to the intermediate axis must exceed the anisotropy field which is typically 4 to 6 oersteds. ($I_w$ as the word line current should exceed $1.5 \times H_k$.) The field required to switch the magnetic dipoles from the intermediate axis to a 0 or 1 state depends on the dispersion which must be large enough to provide stability against stray fields. The drive field must also be smaller than the creep threshold for the film which is typically less than 5 oersted field. This latter restriction arises since unselected bits in the 1 or 0 state will experience the same bit pulses as those set in the "i" state along the previously selected word line. The pulses must be large enough to rotate bits from the "i" state but not large enough to disturb bits in the 0 or 1 state.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic storage device comprising a magnetic element exhibiting uniaxial anisotropic characteristics defining opposite remanent stable states of flux orientation along an easy axis of magnetization and in quadrature with said easy axis a hard axis, said element having a select dispersion between 6° and 10°, a first means including a first conductor coupling said element in alignment with said easy axis for applying a field of predetermined magnitude along said hard axis to switch said element from orientation along said easy axis to a stable oriented state along said hard axis and second means including a second conductor coupling said element in quadrature with said first conductor operative in non-coincident time relationship with said first means for thereafter applying a field of predetermined magnitude along the first axis to switch said element from orientation along said hard axis to stable orientation along said first axis.

References Cited

UNITED STATES PATENTS

| | | | |
|---|---|---|---|
| 3,435,428 | 3/1969 | Bertelsen et al. ______ | 340—174 |
| 3,071,756 | 1/1963 | Pugh ______________ | 340—174 |

OTHER REFERENCES

Spain and Rubinstein, Thin-Film Switching in the Hard Direction by Wall Motion, Journal of Applied Physics, vol. 32, No. 3, March 1961, pp. 288S–289S.

Cohen, Influence of Anisotropy Dispersion of Magnetic Properties of NiFe Films, Journal of Applied Physics, vol. 34, No. 7, July 1963, pp. 1841–47.

Cohen, Anomalous Magnetic Films, Journal of Applied Physics, vol. 33, No. 10, October 1962, pp. 2968–79.

BERNARD KONICK, Primary Examiner

G. M. HOFFMAN, Assistant Examiner